(12) United States Patent
Takakura et al.

(10) Patent No.: US 7,650,957 B2
(45) Date of Patent: Jan. 26, 2010

(54) ACTUATOR MECHANISM FOR LIFTING A HOOD OF A MOTOR VEHICLE

(75) Inventors: Minoru Takakura, Yokohama (JP); Shinji Uehara, Yokohama (JP); Eiji Shimizu, Yokohama (JP); Toshihiro Yoshitake, Atsugi (JP)

(73) Assignees: NHK Spring Co., Ltd., Yokohama-shi (JP); Nissan Motor Co., Ltd., Yokohama-shi (JP)

( * ) Notice: Subject to any disclaimer, the term of this patent is extended or adjusted under 35 U.S.C. 154(b) by 265 days.

(21) Appl. No.: 11/790,552

(22) Filed: Apr. 26, 2007

(65) Prior Publication Data
US 2007/0251750 A1  Nov. 1, 2007

(30) Foreign Application Priority Data
Apr. 27, 2006  (JP) .............................. 2006-124008

(51) Int. Cl.
*B60K 28/10* (2006.01)
(52) U.S. Cl. .................................... 180/274
(58) Field of Classification Search .............. 180/6.2, 180/6.21, 271, 274, 69.21; 296/189.09, 187.09; 188/371, 374; *B60R 21/34*
See application file for complete search history.

(56) References Cited

U.S. PATENT DOCUMENTS

| | | | | |
|---|---|---|---|---|
| 6,499,555 B2 * | 12/2002 | Ishizaki et al. | ............. | 180/274 |
| 6,530,449 B2 * | 3/2003 | Sasaki et al. | ............. | 180/274 |
| 7,232,178 B2 * | 6/2007 | Neal et al. | ............. | 296/187.04 |
| 7,303,040 B2 * | 12/2007 | Green et al. | ............. | 180/274 |
| 7,475,752 B2 * | 1/2009 | Borg et al. | ............. | 180/274 |
| 2002/0011372 A1 * | 1/2002 | Sasaki et al. | ............. | 180/274 |
| 2004/0134705 A1 | 7/2004 | Nadeau et al. | | |
| 2006/0108169 A1 | 5/2006 | Borg et al. | | |

FOREIGN PATENT DOCUMENTS

| | | |
|---|---|---|
| EP | 1 659 038 A1 | 5/2006 |
| GB | 2 395 693 A | 6/2004 |
| GB | 2 410 782 A | 8/2005 |
| JP | 2004-203379 | 7/2004 |
| JP | 2004-308785 A | 11/2004 |
| WO | WO 2005/075262 A1 | 8/2005 |

* cited by examiner

*Primary Examiner*—Paul N Dickson
*Assistant Examiner*—Robert A Coker
(74) *Attorney, Agent, or Firm*—Foley & Lardner LLP

(57) ABSTRACT

The actuator mechanism of the present embodiment comprises the first cylinder, a rod protruding from the first cylinder to lift a hood and lock balls arranged along the outer periphery of the rod and digging into the rod when the rod is pushed back. The diameter of the lock balls and the lapping amount of the lock balls are within specific ranges.

13 Claims, 13 Drawing Sheets

ACTUATOR MECHANISM FOR LIFTING A HOOD OF A MOTOR VEHICLE

CROSS REFERENCE TO RELATED APPLICATION

This application claims priority from Japanese Patent Application 2006-124008, filed Apr. 27, 2006, all of which are incorporated herein by reference in their entirety.

BACKGROUND OF THE INVENTION

1. Field of the Invention

The present invention relates to an actuator for lifting a hood of a motor vehicle, particularly relates to a one-way locking mechanism of the actuator.

2. Description of the Related Art

A mechanism for lifting a hood of a motor vehicle has been proposed to absorb collision energy when an obstacle collides with the hood. The mechanism lifts the back end of the hood with the front end of the vehicle as a fulcrum to provide a space behind the hood in the event of the collision. When the obstacle collides with the hood, the hood can deform downward so as to improve the absorption amount of the collision energy by the deformation of the hood.

Such a mechanism for lifting a hood is disclosed in Japanese Unexamined Patent Application Publication No. 2004-203379 (hereafter referred to Nadeau et al, equivalent to U.S. Patent Application Publication No. 2004/0134705 A1), for example, which is hereby incorporated by reference. According to Nadeau et al., a hood (bonnet) is engaged with a body of a vehicle rotatably around a rotation axis at a rear part of the hood. In a normal operation, the hood rotates about a vehicle body to open. In the event of a collision, an actuator lifts a link rod engaged with the rotation axis so that the rear part of the hood is lifted. In the actuator, an explosive power of gunpowder and the like makes the rod protrude from a cylinder to generate the actuator force.

SUMMARY OF THE INVENTION

In a shock absorption mechanism for lifting the hood, the sinking of the hood can absorb the shock, as well as deformation of the hood. That is, the rod of the actuator supporting the hood returns into the cylinder in accordance with the shock added to the hood and the sinking of the hood absorbs the shock. This results in improving the shock absorption characteristics moreover.

However, when the shock absorption mechanism in which the rod of the actuator returns into the cylinder is used, it is difficult to determine the strength of the force required for returning the rod into the cylinder. That is, when the rod returns into the cylinder with small force, the hood gets back to the initial position without absorbing the shock sufficiently. Further, the strength for supporting the hood may be insufficient to keep it lifted.

On the contrary, if the force required for putting back the rod into the cylinder is too large, the rod does not return into the cylinder but the hood merely deforms when an obstacle impacts the hood and cannot show its shock absorption characteristics. For stable shock absorption, substantially constant load is to be applied to the rod.

A layout condition should be considered in case of applying such a mechanism for lifting the hood to a motor vehicle. The space of the front body is limited. If the components required for lifting the hood, such as an actuator etc., are too large, they cannot be housed in the limited space. Accordingly, the components, including the actuator, required for the mechanism for lifting the hood are preferably small-sized.

The present invention has been accomplished in view of the above-described circumstances and an object of the present invention is to realize small-sized components and an improvement of shock absorption characteristics in applying the mechanism for lifting the hood to a motor vehicle.

An actuator mechanism according to an embodiment of the present invention for lifting a hood of a car in response to a shock to the car includes: a cylinder; a protrusion part protruding from the cylinder; a lock component arranged along an outer periphery of the protrusion part in the cylinder, wherein when the protrusion part is pushed back into the cylinder, the lock component digs into the protrusion part to generate a deceleration loading at rest with respect to the cylinder in a space in which a gap between an inner surface of the cylinder and outer surface of the protrusion part is smaller than a size of the lock component. It achieves miniaturization of components and improvement of the shock absorbency in a hood lifting mechanism in a car.

It is preferable that the actuator mechanism further includes an outer cylinder larger than the cylinder, wherein the actuator mechanism is a multistage mechanism in which the cylinder protrudes from the outer cylinder. It accomplishes a necessary stroke in a limited space. It can achieve the necessary stroke in a limited space.

It is preferable that the lock component is a lock ball, and a plurality of lock balls are arranged at regular intervals along the outer periphery of the protrusion part. It enables adding loads to the protrusion part without displacing the push back direction of the protrusion part.

Furthermore, it is preferable that diameters of the lock balls are from 2 mm to 3.5 mm, and lapping amounts of the lock balls digging into the protrusion part are 0.1 mm to 0.3 mm. It enables adding substantially constant loads to the protrusion part while the protrusion part is being push back into the cylinder.

It is preferable that the actuator mechanism further includes a dividing part restricting a movement of the lock component in a direction along the outer periphery of the protrusion part in a plane perpendicular to a protrusion direction of the protrusion part. It prevents the lock component from moving to make noise in an ordinary state. Further, when there are plural lock components, it prevents the arrangement of the lock components from deviating, resulting in adding loads to the protrusion part without displacing the push back direction of the protrusion part.

It is preferable that the actuator mechanism further includes a taper part which is a part of the cylinder, formed at an inlet of the space and has an inner diameter decreasing gradually in a direction from a protrusion side of the protrusion part to the opposite side, wherein the lock component moves in the space along an inner surface of the taper part and digs into the protrusion part. It reduces the possibility that the lock component does not dig into the protrusion part and does not show the deceleration ability when the protrusion part is pushed back.

It is preferable that the actuator mechanism further includes a pressing part pressing the lock component toward the inlet of the space. It reduces the possibility that the lock component does not dig into the protrusion part and does not show the deceleration ability when the protrusion part is pushed back.

Further, it is preferable that the pressing part is elastic, and the lock component presses and deforms the pressing part to move away from the inlet of the space while the protrusion part is protruding from the cylinder. It prevents the lock component from interfering with the protrusion part protruding from the cylinder.

It is preferable that the pressing part includes a dividing part restricting a movement of the lock component in a direction along the outer periphery of the protrusion part in a plane perpendicular to a protrusion direction of the protrusion part. The multifunction component can reduce the number of components.

It is preferable that the pressing part is a ring-shaped component arranged along an inner surface of the cylinder. It can ease assembling the components.

It is preferable that the pressing part is fixed on the cylinder pressed in a direction of the pressing part pressing the lock component, and a part of the pressing part engages with a part of the cylinder in the direction of the pressing the lock component. It can easily fix the pressing part to the cylinder and prevent the pressing part from pressing the lock component too much.

It is preferable that the pressing part includes a rigid part which is more rigid than a part pressing the lock component, and the rigid part engages with a part of the cylinder. It enables more precise positioning of the pressing part in the cylinder and preventing the pressing part from pressing the lock component too much.

It is preferable that the cylinder comprises a straight part of which an inner diameter is constant in a direction from a protrusion side of the protrusion part to the opposite side, and the lock component digs into the protrusion part in a state of standing still on the straight part. Since it is merely required to control the inner diameter of the straight part in order to control the lapping amount of the lock component, the number of components whose manufacturing tolerances are to be controlled reduces.

It is preferable that the actuator mechanism further includes a stopper part stopping the lock component with respect to the cylinder in the space while the protrusion part is being pushed back into the cylinder. It allows the lock component to generate constant loadings during the push back of the protrusion part into the cylinder.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1:
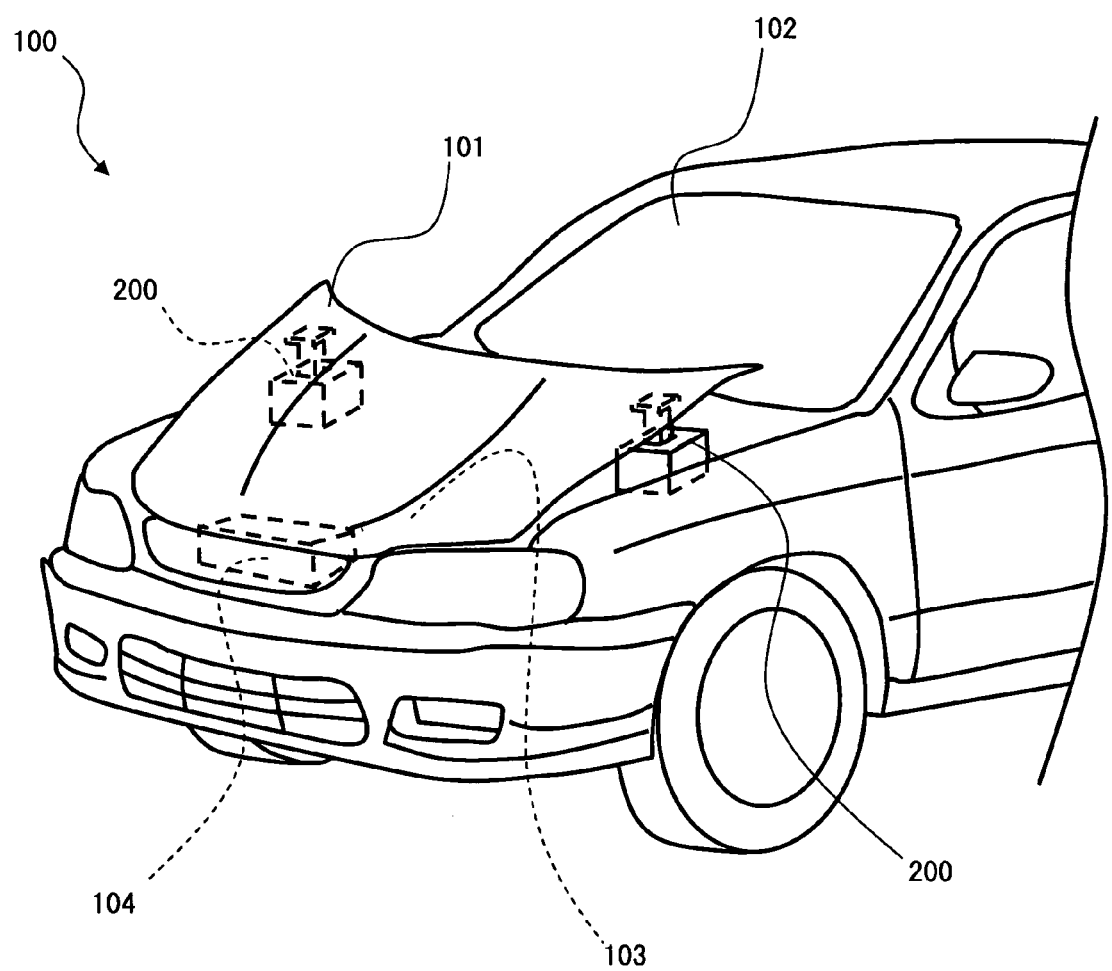
FIG. 1 is a perspective view schematically showing the motor vehicle having an actuator according to an embodiment of the present invention.

Preferred embodiments of the present invention are described in detail hereinbelow. For clear explanations, omissions and simplifications are made in the following descriptions and the drawings. Identical elements are denoted by identical reference numerals and repeated descriptions are omitted if necessary.

The present embodiment relates to an actuator for lifting a rear end of a hood of a motor vehicle, particularly to a deceleration mechanism while a rod protruded from a cylinder is being pushed back into the cylinder. The deceleration mechanism of the actuator according to the present invention applies a constant deceleration loading to the rod while the rod protruded from the cylinder is being pushed back into the cylinder. In the following descriptions, the traveling direction of the vehicle is defined as a reference. Namely, the direction in which the vehicle is headed, i.e., the direction a driver is facing is the front.

First Embodiment

FIG. 1 is a perspective view schematically showing a motor vehicle 100 with the rear end of a hood 101 lifted by an actuator 200 according to the present embodiment. The motor vehicle 100 according to the present embodiment has an engine room 103 in front of a front glass 102. The hood 101 is provided over the engine room 103 and it usually covers the engine room 103.

When a collision detector 104 equipped to the vehicle body detects a collision, an actuator 200 begins the operation to lift the rear end of the hood 101 which is at the side of the front glass 102 as shown in FIG. 1. Hereby a space is provided between the hood 101 and the engine room 103 so that the hood 101 can be deformed and shifted by the space. When an obstacle collides with the hood 101, the deformation and the shift of the hood 101 reduce the shock to the obstacle. As shown in FIG. 1, two actuators 200 are provided in the present embodiment, the tip ends (heads) of the protrusible rods are engaged with the hood 101.

Figure 2:
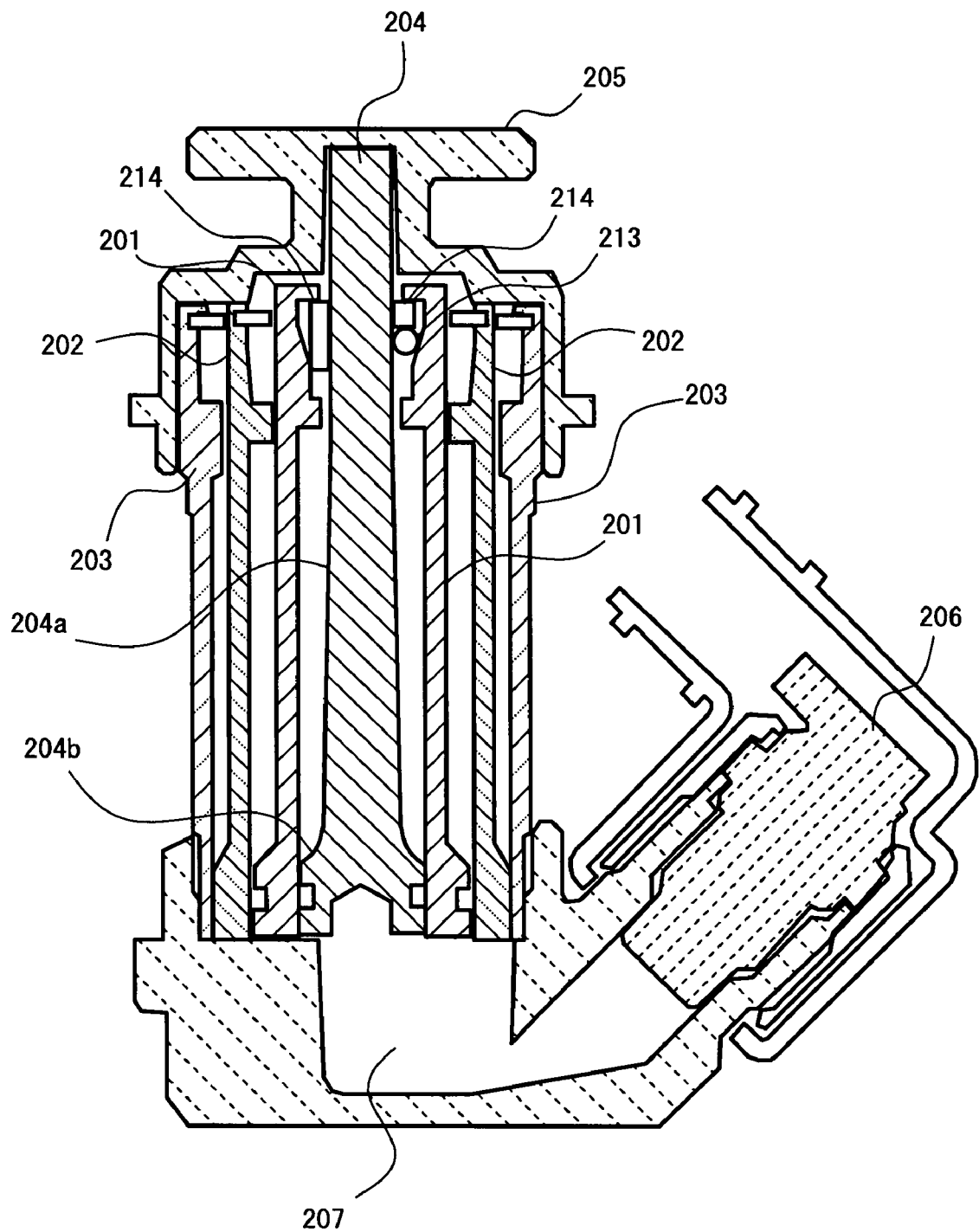
FIG. 2 is a cross-sectional view schematically showing the actuator according to an embodiment of the present invention.
Figure 3:
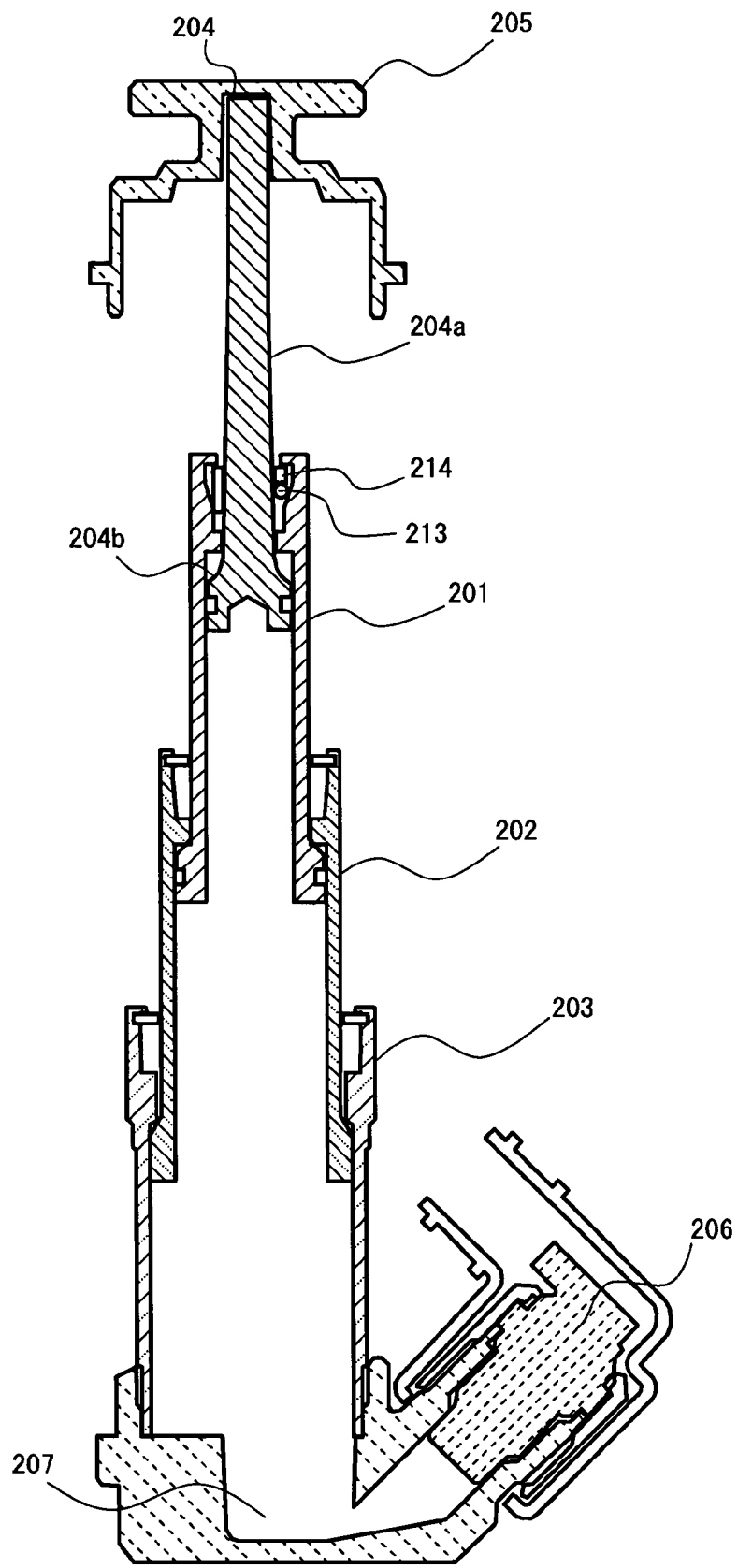
FIG. 3 is a cross-sectional view schematically showing the actuator according to an embodiment of the present invention.

Now referring to FIGS. 2 and 3, the actuator 200 according to the present embodiment is explained. FIG. 2 is a cross-sectional view of the actuator 200 in a state before operation. The actuator 200 is a multistage actuator and comprises a first cylinder 201, a second cylinder 202, a third cylinder 203, a rod 204, a head 205, a gas generator 206, and a gas injection space 207. The protrusion amount, i.e., stroke, required as the actuator is realized in a small space because the actuator is multistage. A gas generator 206 is connected to the collision detector 104. The gas generator 206 receives an electric signal informing detection of the collision from the collision detector 104 provided in the vehicle.

The gas generator 206 injects gas into the gas injection space 207 in accordance with the electric signal received from the collision detector 104. The gas injection of the gas generator 206 increases the pressure in the gas injection space 207 so that the rod 204, the first cylinder 201, and the second cylinder 202 are lifted and then the head 205 rises. The head 205 is engaged with the hood 101 and the rise of the head 205 causes the actuator 200 to lift up the rear end of the hood 101 as shown in FIG. 1. Lock balls 213 and a rubber ring 214 are provided inside of an opening at the tip end, i.e., the end from which the rod 204 protrudes, of the first cylinder 201. The lock balls 213 are component to add a deceleration load to the rod 204 when the rod 204 which protrudes from the first cylinder 201 is pushed back into the first cylinder 201. The rubber ring 214 is a component for the lock balls 213 to show its function properly.

Figure 4:
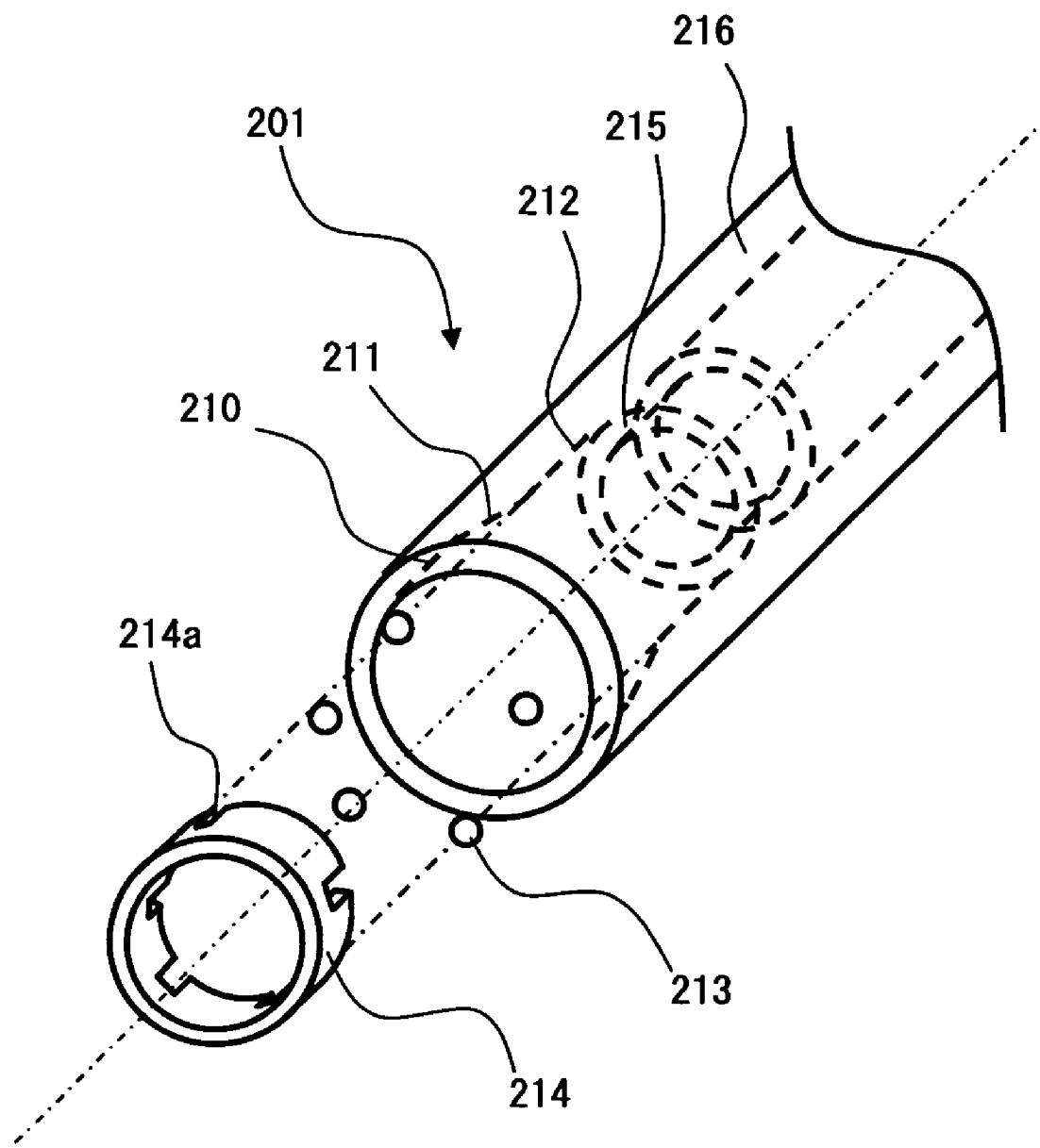
FIG. 4 is a cross-sectional view schematically showing a part of the actuator according to an embodiment of the present invention.
Figure 5A:
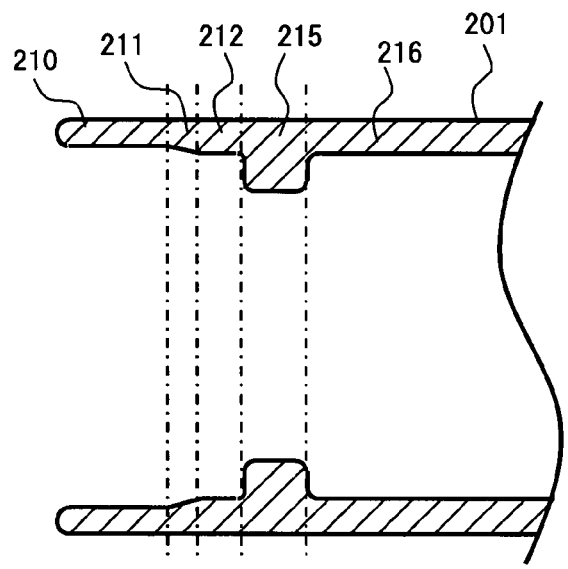
FIGS. 5A to 5C are cross-sectional views schematically showing a part of the actuator according to an embodiment of the present invention.
Figure 5B:
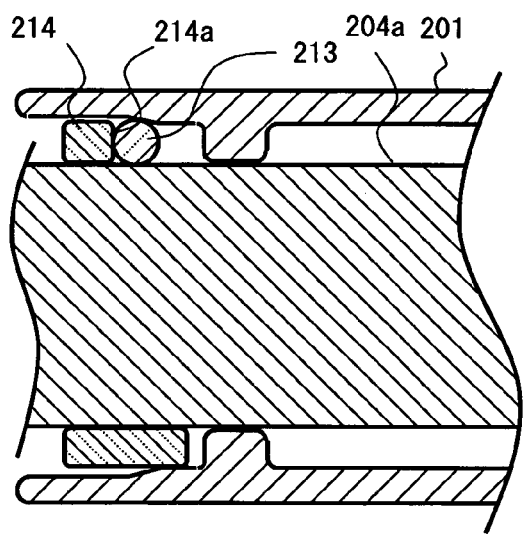
Figure 5C:
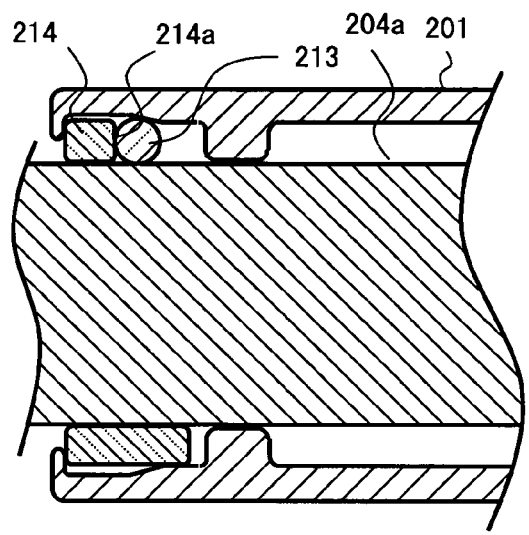
Figure 6:
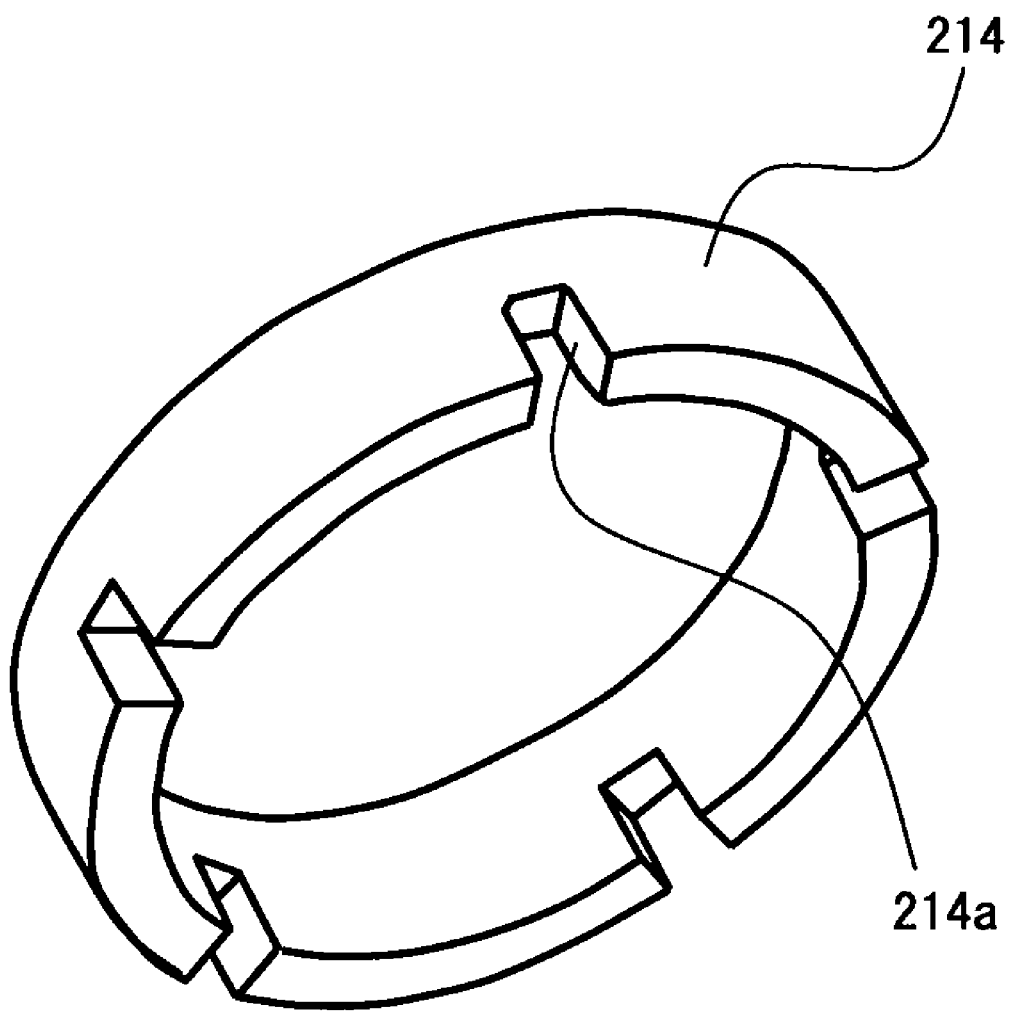
FIG. 6 is a perspective view schematically showing the rubber ring according to an embodiment of the present invention.

Next, the first cylinder 201, the rod 204, the lock balls 213, and the rubber ring 214 are explained. FIG. 4 is a perspective view schematically illustrating the tip end and its peripheral part of the first cylinder 201 before assembling the first cylinder 201, the lock balls 213, and the rubber ring 214. FIG. 4 shows a part of them transparently. FIG. 5A is a partial cross-sectional view showing the first cylinder only and FIG. 5B is a partial cross-sectional view showing the first cylinder 201, the rod 204, the lock balls 213, and the rubber ring 214, which are partially assembled. FIG. 5C is a partial cross-sectional view showing the rod 204, the first cylinder 201, and a part of their peripheral components in the state of FIG. 2. FIG. 6 is an enlarged perspective view of the rubber ring 214.

The first cylinder 201, the lock balls 213, and the rubber ring 214 are explained respectively. As shown in FIGS. 4 and 5A, the first cylinder 201 is tubular and comprises a plastic part 210, a taper part 211, a straight part 212, a small diameter part 215, and a body part 216 in order from the tip end as divided by dashed lines of FIG. 5A.

Dividing lines denoted by the dashed lines in FIG. 5A do not appear in the actual first cylinder 201 but they divide the first cylinder 201 virtually according to the configurations and roles of the respective parts. As shown in FIG. 5C, the end of the plastic part 210 is swaged with the lock balls 213 and the rubber ring 214 being housed in the first cylinder 201 so that the lock balls 213 and the rubber ring 214 are fixed.

The taper part 211 is a part of the first cylinder 201 and getting narrower in its inner diameter from the tip end toward the opposite end of the first cylinder 201. The taper part 211 is formed adjacent to the plastic part 210 and at the base side of the first cylinder 201 with respect to the plastic part 210, which is opposite to the rod protrusion side, and its inside wall joins to the one of the plastic part 210 without step difference. Therefore, the largest inner diameter of the taper part 211 is almost the same as the one of the plastic part 210.

The straight part 212 is a part whose inner diameter is substantially uniform in the first cylinder 201, and is formed between the taper part 211 and the small diameter part 215. That is, the straight part 212 is formed at the smaller inner diameter side of the taper part 211 and its inside wall joins to the taper part 211 without step difference. Therefore, the smallest inner diameter of the taper 211 is substantially same as the one of the straight part 212. The small diameter part 215 has a smaller inner diameter than the straight part 212 and is formed closer to the base side of the first cylinder 201 than the straight part 212. The small diameter part 215 is formed like a step difference in the inside wall of the first cylinder 201.

The body part 216 is a body of the first cylinder 201. The body part 216 is formed closer to the base side of the first cylinder 201 than the small diameter part 215 and occupies the most part of the first cylinder 201. The inner diameter of the body part 216 is larger than the one of the small diameter part 215 and there is a step edge between the small diameter part 215 and the body part 216. The step edge between the small diameter part 215 and the body part 216 or the straight part 212 may be tapered.

The lock balls 213 are spherical components made of metal material and are disposed along the outer peripheral of the rod 204 and add a deceleration load to the rod 204 by digging into the rod 204. Therefore, the lock balls 213 are made of a higher strength material than the rod 204. The lock balls 213 are preferably as spherical as possible because their diameters influence the deceleration loads. The lock balls may be spheres made of a material other than metals. The diameter of the lock balls 213 of the present embodiment is 3.0 mm.

The rubber ring 214 is a ring-shaped elastic component having a plurality of notches 214a on one side thereof, as shown in FIG. 6. The outer diameter of the rubber ring 214 is almost the same as the inner diameter of the straight part 212. The thickness of the diameter direction of the rubber ring 214 is almost the same as the diameter of the lock balls 213. Five notches 214a are formed in one rubber ring 214. The rubber ring 214 is notched by almost half width in its horizontal direction to the central axis. The notches 214a penetrate from the outer surface to the inside surface of the rubber ring 214.

The respective notches 214a are formed equally-spaced along the periphery of the rubber ring 214. The peripheral direction size of the respective notches 214a is almost the same as the diameter of the lock balls 213 and the lock balls 213 are housed in the respective notches 214a in the assembled actuator 200. Because the rubber ring 214 is an elastic body, the lock balls 213 can be pushed into the notches 214a even if the widths of the notches 214a are smaller than the diameters of the lock balls 213. The widths of the notches 214a may be smaller or larger than the diameters of the lock balls 213 if the notches can house the lock balls 213.

The rod 204 comprises a column-shaped column part 204a and a stopper part 204b which is provided at one end of the column part 204a. The column part 204a protrudes from the first cylinder 201 at the operation of the actuator 200 and a head 205 is provided at the opposite end of the stopper part 204b. The bottom surface of the column part 204 has a substantially similar shape to the opening shape of the first cylinder 201 and the outer diameter thereof is substantially the same as the inner diameters of the small diameter part 215 and the rubber ring 214. The stopper part 204b is to stop the protrusion of the rod 204 from the first cylinder 201 and is arranged in an area of the body part 216 inside of the first cylinder 201.

The outer diameter of the stopper part 204b increases drastically with distance from the column part 204a to be substantially the same as the inner diameter of the body part 216.

That is, the stopper part 204b has apart with a larger outer diameter than the inner diameter of the small diameter part 215. Therefore, the stopper part 204b cannot go through the inside of the small diameter part 215, and the stopper part 204b and the small diameter part 215 fit each other to stop the protrusion of the rod 204 from the first cylinder 201 as shown in FIG. 3.

Next, assembling the first cylinder 201, the rod 204, the lock balls 213, and the rubber ring 214 is explained. The lock balls 213 and the rubber ring 214 are inserted into the first cylinder 201 with the rod 204 inserted in the first cylinder 201 as shown in FIG. 5B. Because the stopper part 204b of the rod 204 cannot get through the small diameter part 215, the rod 204 should be inserted from the base side of the first cylinder 201. The central axes of the rod 204 and the first cylinder 201 coincide with each other for insertion.

As shown in FIG. 4, the center axes of the rubber ring 214 and the first cylinder 201 are made to substantially coincide and the rubber ring 214 is inserted into the first cylinder 201 from the side of the plastic part 210 so that the lock balls 213 are housed in the respective notches 214a. Then, the rubber ring 214 reaches the straight part 212 as the inner diameter of the straight part 212 is substantially the same as the outer diameter of the rubber ring 214. The inner diameter of the small diameter part 215 is smaller than the outer diameter of the rubber ring 214. Therefore, the rubber ring 214 does not go into the first cylinder 201 past the small diameter part 215, i.e., it does not get to the body part 216 of the first cylinder 201, i.e., the opposite side to the rod 204 protrusion side inside of the first cylinder 201.

As shown in FIG. 5B, the column part 204a penetrates through the small diameter part 215 and the rubber ring 214 in the state that respective components have been assembled. The lock balls 213 are sandwiched among the rubber ring 214, a tapered part 211, and the column part 204a. In the state that the rod 204 is held within the first cylinder 201 with their central axes coinciding with each other, the distance between the column part 204a and the plastic part 210 are larger than the diameter of the lock balls 213. The distance between the column part 204a and the straight part 212 is smaller than the diameter of the lock balls 213. The lock balls 213 show the deceleration performance in a space between the column part 204a and the straight part 212, i.e., a deceleration space where the distance between the rod 204 and the inner wall of the first cylinder 201 is smaller than the diameter of the lock balls 213.

Therefore, the lock balls 213 abut on the tapered part 211 and are held between the column part 204a and the taper part 211 when the lock balls 213 are inserted into the first cylinder 201 along the column part 204a. Specifically, the inner diameter of the taper part 211 is gradually getting smaller as going backward along the first cylinder 201 so that the gap between the taper part 211 and the column part 204a decreases, then it becomes smaller than the diameter of the lock balls 213 at a certain point. The backside space of the point is the deceleration space. The lock balls 213 are sandwiched between the taper part 211 and its opposed column part 204a at the point where they abut on both of the taper part 211 and the column part 204a.

In this state, the rubber ring 214, which in an exemplary embodiment corresponds to the dividing part discussed above, is inserted into the first cylinder 201 (in an exemplary embodiment, at least when inserted into cylinder 201, the rubber ring 214 corresponds to the pressing part discussed above), and the rubber ring 214 contains the lock balls 213 in the notches 214a. This restricts their movement along with a longitudinal direction. Specifically, the lock balls 213 are held between the taper part 211 and the rubber ring 214 in the longitudinal direction of the column part 204a and are held by rubber ring 214 along the peripheral direction to restrict their movement. Here, the rubber ring 214 is placed to push the lock balls 213 onto the taper part 211, i.e., the inlet of the deceleration space and in the state, the elasticity remains in the rubber ring 214, namely, the rubber ring 214 can be crushed by the lock balls 213 when the lock balls 213 is moved inside of the first cylinder 201 toward the tip end.

As shown in FIG. 5C, the tip end of the plastic part 210 is swaged to cover the rubber ring 214 so that the rubber ring 214 and lock balls 213 are fixed. That is, the plastic part 210 is swaged with the lock balls 213 being sandwiched among the rubber ring 214, the taper part 211, and the column part 204a, so that the first cylinder 201, the rod 204, the lock balls 213, and the rubber ring 214 are assembled. Because the rubber ring 214 is a ring-shaped component, the rubber ring can be inserted along the rod 204, allowing easy assembling of the components.

The first cylinder 201 and the rod 204 are respectively made of metal materials. As described above, the lock balls 213 are sandwiched between the taper part 211 and the column part 204a. When the lock balls 213 add a deceleration load to the column part 204a, the lock balls 213 dig into the column part 204a while moving from the taper part 211 to the straight part 212, i.e., the deceleration space. Namely, the column part 204a, i.e., the rod 204, is made of a metal having lower intensity than the lock balls 213. In order for the lock balls 213 to dig mainly into the column part 204a rather than the taper part 211 and the inside wall of the straight 212, i.e., the inside wall of the first cylinder 201, the first cylinder 201 is made of a metal having higher intensity than the rod 204.

Figure 7A:
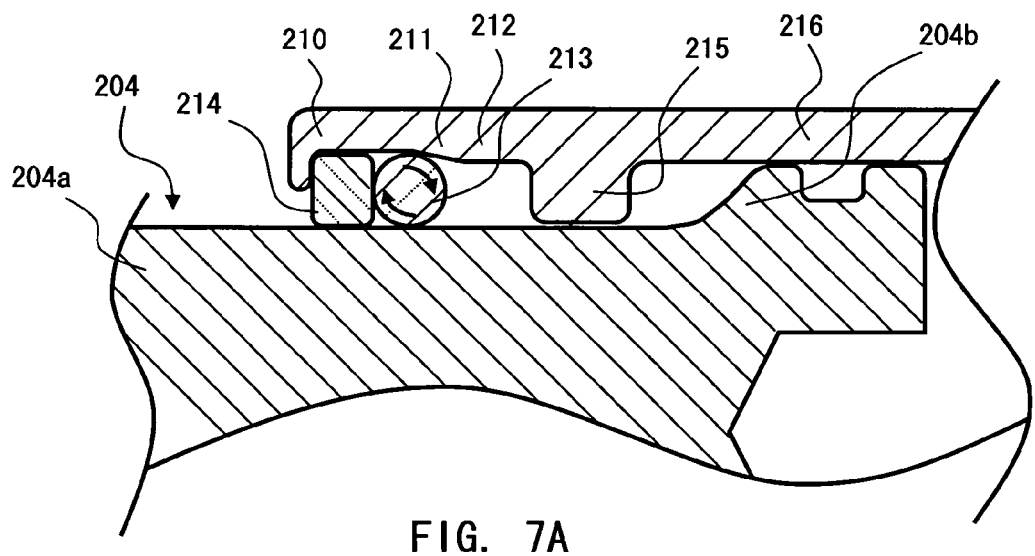
FIGS. 7A to 7C are cross-sectional views schematically showing a part of the actuator according to an embodiment of the present invention.
Figure 7B:
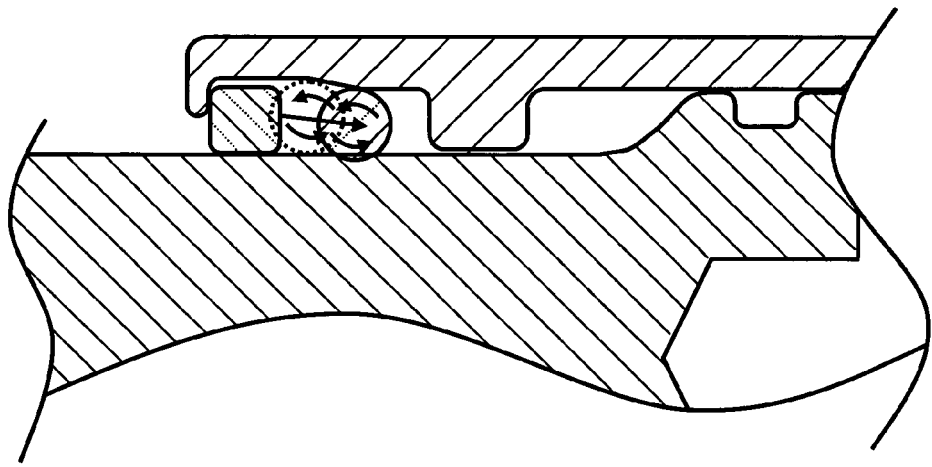
Figure 7C:
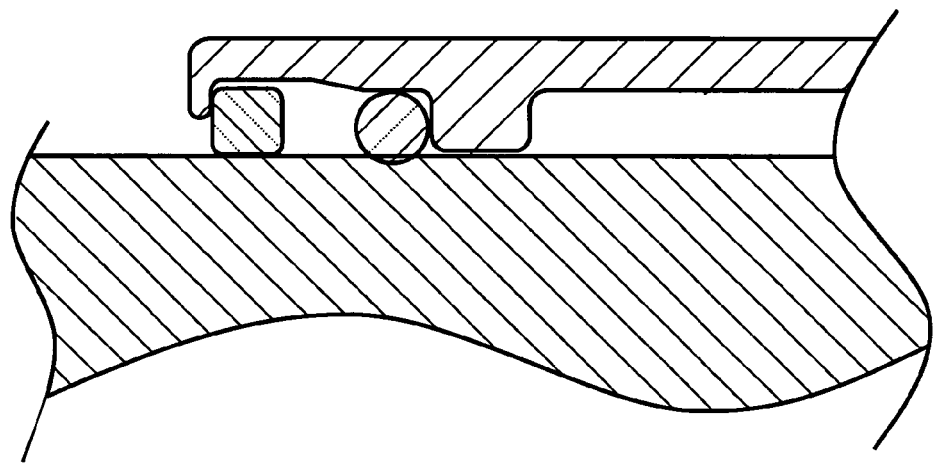

Next, referring to FIGS. 7A through 7C, an operation of the rubber ring 214 and the lock balls 213 is described. FIG. 7A is a partial cross-sectional view showing the rod 204 protruding from the first cylinder 201. In FIG. 7A through 7C, one side of the first cylinder is shown. The actuator 200 starts the operation in the state that the rod 204 is housed in the first cylinder 201 as shown in FIG. 5C and the column part 204a protrudes from the plastic part 210 toward outside of the first cylinder 201. That is, the column part 204a moves relatively to the first cylinder 201. Then, the lock balls 213 held between the column part 204a and the taper part 211 rotate as illustrated by an arrow in FIG. 7A.

Specifically, as the column part 204a and the taper part 211 moves relatively, the lock balls 213 rotate on the taper surface of the taper part 211 toward the direction where the inner diameter of the taper part 211 is getting larger, i.e., toward the tip end, and move to the region of the plastic part 210. At this time, the lock balls 213 are pushed against the rubber ring 214 and compress the rubber ring 214 to move. Because the distance between the inner surface of the plastic part 210 and the column part 204a is larger than the diameter of the lock balls 213, the lock balls 213 add little loads to the column part 204a while the column part 204a is protruding from the first cylinder 201.

When the lock balls 213 enters the region of the plastic part 210, the lock balls 213 are not sandwiched between the plastic part 210 and the column part 204a so that the rotating force indicated by the arrows in FIG. 7A does not affect the lock balls. Thus, the lock balls 213 are pushed against the taper part 211 again by the elasticity of the rubber ring 214 and sandwiched between the taper surface of the taper part 211 and the column part 204a. However, if the lock balls 213 are sandwiched between the taper part 211 and the column part 204a, the lock balls 213 rotate again by the relative moving of the column part 204a to the taper part 211 to move to the region of the plastic part 210. While the actuator 200 operates and the rod 204 is protruding from the cylinder 201, the lock balls 213 do not prevent the rod 204 to protrude.

As shown in FIG. 3, the engagement of the stopper part 204a with the small diameter part 215 makes the column part 204a stop protruding from the first cylinder 201. Then, the rotating force indicated by the arrow in FIG. 7A does not affect the lock balls 213. Thus, the lock balls 213 are pushed against the taper part 211 by the elasticity of the rubber ring 214 to be sandwiched between the taper part 211 and the column part 204a.

FIG. 7B is a partial cross-sectional view illustrating the state that the rod 204 is pushed back toward the back of the first cylinder 201. As shown in FIG. 3, when the rod 204 moves toward the back of the first cylinder 201 in accordance with the influence of the weight of itself, the head 205, or the hood 101, etc. with the rod 204 being fully protruded from the first cylinder 201, the lock balls 213 rotate on the taper surface of the taper part 211 toward the direction where the inner diameter is getting smaller with relative movement of the column part 204a and the taper part 211. Namely, the lock balls 213 rotate toward the backside, and move toward the region of the straight part 212, i.e., the deceleration space.

At this time, the lock balls 213 move toward the direction where the distance between the inner wall of the taper part 211 and its opposed column part 204a decrease and are pushed against the column part 204a by the taper surface of the taper part 211 to dig into the column part 204a. Thus, the lock balls 213 add loads to the column part 204a to realize the one-way locking mechanism in which the rod 204 is not locked in the direction where it protrudes from the first cylinder 201 but it is locked in the direction that the rod 204 goes back inside the first cylinder 201.

FIG. 7C is a partial cross-sectional view showing the state that a shock is added to the hood 101 and a load is added to the rod 204 via the head 205. In this case, the rod 204 moves toward the back of the first cylinder 201 according to the load added to the rod 204. When the column part 204 moves toward the back of the first cylinder 201, the lock balls 213 are depressed into the column part 204a according to the operation illustrated in FIG. 7B, and move toward the back of the first cylinder 201 together with the column part 204a.

At this time, a force is added to the lock balls 213 to rotate on the taper surface of the taper part 211 toward the direction where the inner diameter is getting smaller, in the same way as in FIG. 7B. However, the lock balls 213 are embedded in the column part 204a and sandwiched by a strong force between the taper part 211 or the straight part 212 and the column part 204a. Therefore, if the frictional force generated by the force sandwiching the lock balls 213 between the taper part 211 or the straight part 212 and the column part 204a is larger than the rotational force added to the lock balls 213, the lock balls 213 do not rotate but are pushed against the column part 204a by the taper surface of the taper part 211 to dig into the column part 204a and move without rotation along the taper part 211 and the straight part 212 toward the back of the first cylinder 201.

The lock balls 213 move to the region of the straight part 212 and further to the back side of the first cylinder 201, then they reach the step difference part between the straight part 212 and the small diameter part 215. Because there is little gap between the small diameter part 215 and the column part 204a, the lock balls 213 stop at the step difference part between the straight part 212 and the small diameter part 215. That is, the step difference part between the straight part 212 and the small diameter part 215 serves as a stopper. In this state, when the column part 204a moves further toward the back side of the first cylinder 201, the lock balls 213 embedded in the column part 204a and at rest in the deceleration space with respect to the cylinder 201 add loads to the column part 204a.

According to such an operation, the moving velocity of the rod 204 toward the back side of the first cylinder 201 can be decelerated. Further, the lock balls 213 adding loads to the column part 204 in the rest state enable to add substantially constant loads notwithstanding to the relative moving amount of the rod 204 to the first cylinder 201, i.e., the stroke of the rod 204. As a result, in the shock absorbing mechanism lifting the hood 101, it realizes a sinking mechanism with constant loads to the hood 101 as well as the deformation of the hood 101 so that the shock absorbing characteristics in the mechanism for lifting the hood 101 can be improved moreover.

In such an actuator 200, as evaluation characteristics of the loading values added to the rod 204 when the rod 204 is pushed back into the first cylinder 201, there is a characteristic (FS characteristic) indicated by a pushing back amount S and a loading value F corresponding to the pushing back amount S. As a preferable FS characteristic, the load F added to the rod 204 reaches close to the maximum while the pushing back amount S of the rod 204 to the first cylinder 201 is still small, then a substantially constant load F is added to the rod 204 while the rod 204 is being pushed back to the first cylinder 201.

There is a parameter to determine the FS characteristic such as the maximum digging amount (lapping amount) of the lock balls 213 to the column part 204a and the diameter of the lock balls 213 (ball diameter). When the lapping amount is too small, the maximum value of the loading value F is small so that the resistance force against the shock added to the hood 101 is too small, resulting in that the hood 101 sinks down immediately and the shock absorbing characteristic is not shown. When the lapping amount is too small, the spacing between the straight part 212 and the column part 204a may be larger than the diameter of the lock balls 212 due to the dimensional deviation of the respective components so that the possibility that the loads is not added to the rod 204 increases. On the other hand, when the wrap amount is too large, the loading value F for the pushing back amount S is not stable so that the shock absorbing ability is damaged.

Figure 8:
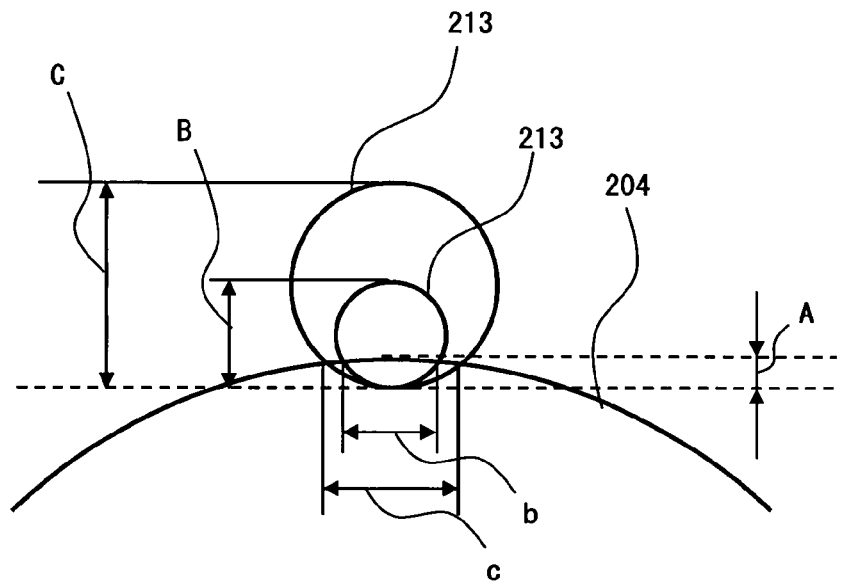
FIG. 8 is a view showing the status of the lock balls digging into the rod according to an embodiment of the present invention.

Referring to FIG. 8, cases that the diameter of the ball is small and large in the same lapping amount are examined. As shown in FIG. 8, in an identical lapping amount A, a case that the ball diameter is B and a case that the ball diameter is C are compared. The ball diameter C is larger than the ball diameter B. When the ball diameter is B, the digging range, i.e. digging width is b and when the ball diameter is larger C, the digging range is c. Therefore, in the case that the ball diameter is small, the ball acts more like a point. As the digging range is closer to a point, the loading value versus the pushing back amount S is less stable. Accordingly, the ball diameter is preferably large, but on the contrary, if the ball diameter is too large, the size of the first cylinder increases and the actuator 200 cannot be housed in a limited space.

Figure 9:
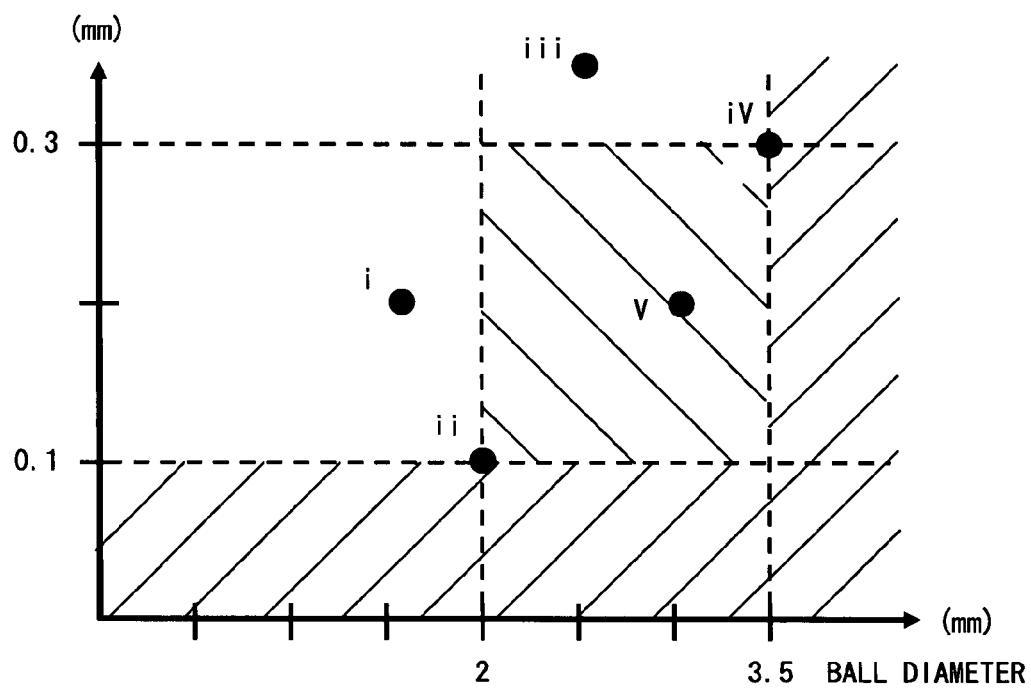
FIG. 9 is a view showing a relationship between the diameter of the lock balls and the lapping amount to the rod in the actuator according to an embodiment of the present invention and the actuator of the comparative example.

A preferable range of respective parameters is shown in FIG. 9 in which the horizontal axis indicates the ball diameter and the vertical axis indicates the wrapping amount. Further, the respective FS characteristics at the characteristic points i to v are shown in the graphs of FIGS. 10A, 10B, and 11A to 1C. As shown in the region filled with positive slopes, the range where the ball diameter is larger than 3.5 mm is not preferable in view of the size of the actuator 200 and the range where the lapping amount is less than 0.1 mm is not preferable either because the maximum amount of the loading value F is too small.

In FIG. 9, the characteristic i indicates the state of the lapping amount 0.2 mm and the ball diameter 1.5 mm; the characteristic ii, the lapping amount 0.1 mm and the ball diameter 2 mm; the characteristic iii, the lapping amount 0.35 mm and the ball diameter 2.5 mm; the characteristic iv, the lapping amount 0.3 mm and the ball diameter 3.5 mm; and the characteristic v, the wrapping amount 0.2 mm and the ball diameter 3 mm. As shown by the characteristics ii, iii, and iv in FIGS. 10A through 11C, the loading values F rise drastically in accordance with the pushing back amounts S and then stay without big changes in cases that the lapping amounts are ranging within 0.1 mm to 0.3 mm and the ball diameters are within 2.0 mm to 3.5 mm. This range shows preferable characteristics.

Figure 10A:
FIGS. 10A and 10B are graphs showing the loading values added to the rod for the pushing back amount of the rod in the actuator according to an embodiment of the present invention and a comparative example.
Figure 10B:
Figure 11A:
FIGS. 11A to 11C are graphs showing the loading values added to the rod for the pushing back amount of the rod according to the embodiment of the present invention and the actuator of the comparative example.
Figure 11B:
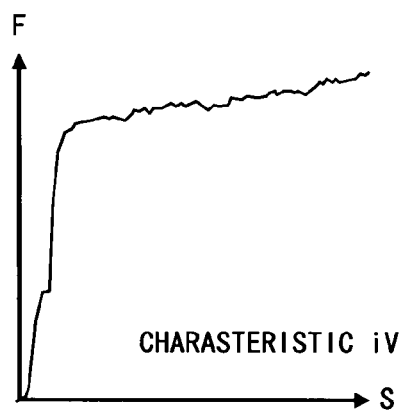
Figure 11C:
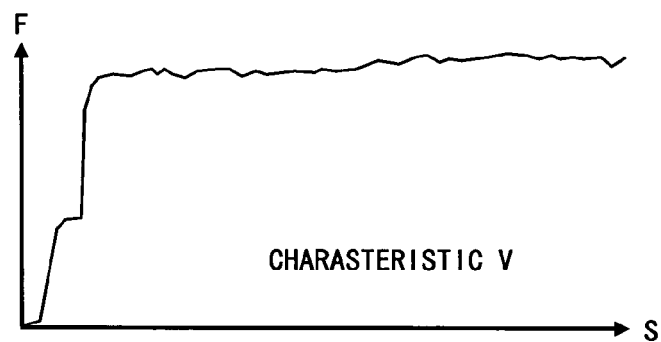

However, as the characteristic i of FIG. 10A shows, the loading value F is not stable and the FS characteristic is not preferable when the ball diameter is 1.5 mm. Further, as the characteristic iii of FIG. 11A shows, even when the ball diameter is within 2 mm to 3.5 mm, the loading value F is not stable in case that the lapping amount is 0.35 mm. Accordingly, as shown in FIG. 9, it is preferable that the lapping amount is within the range of 0.1 mm to 0.3 mm and the ball diameter is within 2 mm to 3.5 mm.

The actuator 200 according to the present embodiment is a multistage cylinder comprising the first cylinder 201 to the third cylinder 203. Therefore, a mechanism which has the lock balls 213 digging into the inner wall of the first cylinder to add deceleration loadings to the rod 204 may influence the outer diameter of the first cylinder 201. As a result, the lock balls 213 may interfere the outer cylinders of the first cylinder 201 so that the cylinders may not retract. As the present embodiment, the lock balls 213 digging into the rod 204, i.e., the mechanism which has the lock balls 213 digging into the inner components in the multistage cylinder, solves the above-described problems.

Generally, in the ball locking mechanism as described above, the loading value generated by the lock balls 213 digging into the inside outer wall is more instable than the lock balls 213 digging into the outside inner wall, i.e., the first cylinder 201. A stable loading can be generated by setting the above-described parameters to solve such a problem.

In the above description, it is described that the rubber ring 214 is provided in addition to the lock balls 213 inside of the first cylinder 201 and the elastic rubber ring 214 pushes the lock balls 213 against the taper part 211. However, the rubber ring 214 does not have to be provided but only the lock balls 213 between the first cylinder 201 and the rod 204 may be provided.

The actuator 200 is disposed to protrude upward as shown in FIGS. 2 and 3 in order to lift the hood 101. Accordingly, the lock balls 213 disposed between the first cylinder 201 and the rod 204 are pulled toward the back side of the first cylinder 201 by the gravity and are supported by the taper part 211 and the column part 204a. Therefore, under normal conditions, the effects as described above are to be obtained if the actuator 200 starts to operate in this state.

However, in the case that the rod 204 is pushed back after having protruded from the first cylinder, the lock balls 213 occasionally do not dig into the column part 204a if the lock balls 213 are not pushed against the inlet of the deceleration space. In this case, even if the column part 204a is pushed back into the inside of the first cylinder 201, the lock balls 213 do not enter the deceleration space but go away to the regions of the plastic part 210 and the taper part 211 so that they do not add the deceleration loading to the column part 204a. Therefore, the rubber ring 214 is preferably provided in order to make the lock balls 213 show the deceleration characteristic.

On the other hand, the lock balls 213 may be pushed against the inlet of the deceleration space by using a rigid body but not an elastic body. It can reliably make the lock balls 213 generate the deceleration loadings. However, because the lock balls 213 cannot move farther from the deceleration space when the rigid body is used, the lock balls 213 may possibly become an obstacle to the rod 204 protruding from the first cylinder 201. Therefore, the component to press the lock balls 213 against the inlet of the deceleration space is preferably an elastic body.

A spring inside the plastic part 210 pressing the lock balls 213 against the taper part 211, i.e., the inlet of the deceleration space produces the same effect as described above. Therefore, a spring may be provided instead of a component made of elastic resin like the rubber ring 214. However, the effect of the notches 214a of the rubber ring 214 cannot be obtained and the movements of the lock balls 213 in the peripheral direction along the column part 204a are not restricted. Accordingly, a plurality of lock balls 213 are not occasionally arranged equally spaced along the periphery of the column part 204a.

As a result, the sum of the loadings added to the column part 204a by the plurality of lock balls 213 sometimes have a vector in a vertical direction to the longitudinal direction of the rod 204 so that the central axes of the first cylinder 201 and the rod 204 get misaligned occasionally. Thus, the stability of the loading value at the time of push-back of the rod 204 into the first cylinder 201 may be lost and the rod 204 may stop before fully being pushed back. Therefore, the rubber ring 214 is preferably provided to overcome such a problem.

In case that the mechanism has only a single lock ball 213, the notches 214a restrict the movement of the lock ball 213 so that a generation of a noise by the movement of the lock ball in a normal occasion can be prevented. Meanwhile, a structure like notches 204a to divide the lock balls may be formed on the inner wall of the first cylinder 201. The structure to push the lock balls 213 against the taper part 211 and the structure to restrict the movement of the lock balls 213, such as the notches 204a, may be separated. However, the rubber ring 214 with a plurality of functions enables reduction of the number of components and simplification of the other components.

In the above explanation of a preferred example, the straight part 212 exists between the taper part 211 and the small diameter part 215, and the lock balls 213 add the deceleration loadings to the column part 204a at the straight part 212. In contrast, the taper part 211 and the small diameter part 215 may be formed adjacent each other via a step difference without the straight part 212. However, the straight part 212 allows easy controlling of the digging amount (lapping amount) of lock balls 213 into the column part 204a.

Figure 12A:
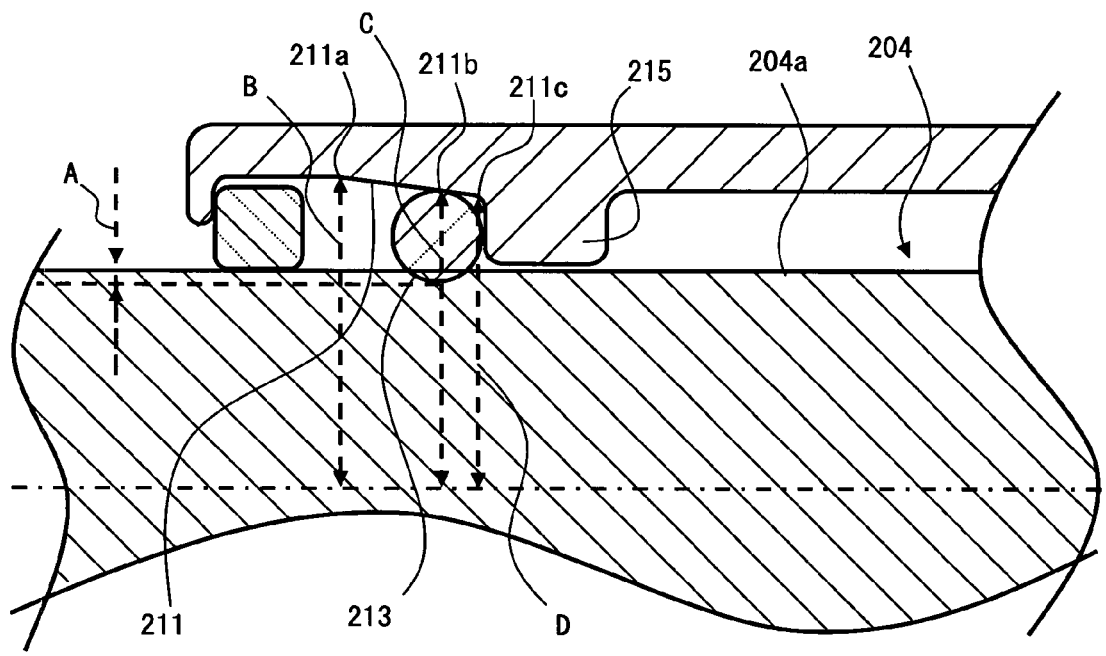
FIGS. 12A and 12B are cross-sectional views schematically showing a part of the actuator according to the embodiment of the present invention.
Figure 12B:
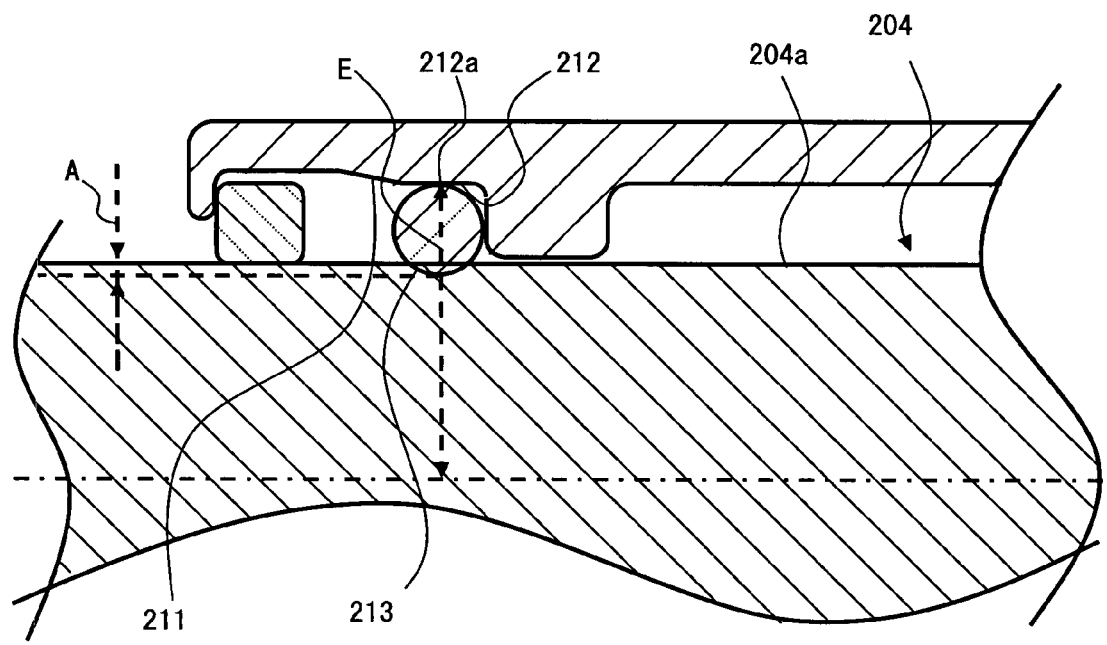

FIG. 12A is a partial cross-sectional view showing an example in which the small diameter part 215 is formed adjacent to the taper part 211 without the straight part 212. FIG. 12B is a partial cross-sectional view showing an example in which the straight part 212 such as shown in FIG. 7C is formed. In order to manage the lapping amount A of the column part 204a by the lock balls 213, the inner radius C of the taper part 211 at the contact point 211b of the taper part 211 and the lock balls 213 in contact with the small diameter part 215 is controlled while considering manufacturing tolerances of the respective components. Here, the inner diameter may be managed instead of the inner radius C. Because the contact point 211b is a point on the taper surface of the taper part 211, it is difficult to manage the inner radius C directly. Therefore, the inner radius B at one end of the taper surface of the taper part 211, i.e., the taper end 211a, and the inner radius D at the other end, i.e., the taper end 211c are controlled.

In contrast, as shown in FIG. 12B, a case where the lock balls 213 between the straight part 212 and the column part 204a add loads to the column part 204a is considered. In order to manage the lapping amount A, controlled is the inner radius E of the straight part 212 at the contact point 212a of the straight part 212 and the lock balls 213 in contact with the small diameter part 215. The contact point 212a is a point on the surface of the straight part 212 and the inner radius E is easily controlled directly. Therefore, forming the straight part 212 enables reduction of the parts whose size are to be managed in manufacturing so that the productivity and the manufacturing yields are improved. Therefore, it is preferable for the lock balls 213 to add the deceleration loadings to the column part 204a at the straight part 212.

In the above example, the taper part 211 is formed between the plastic part 210 and the straight part 212. Contrarily, the plastic part 210 and the straight part 212 may be formed adjacent each other via a step difference. However, the taper part 211 allows the lock balls 213 to move along the taper surface of the taper part 211 and to dig into the column part 204a. Therefore, the lock balls are ensured to move to the straight part 212 and add the deceleration loadings to the column part 204a when the rod 204 is pushed back into the first cylinder 201.

Namely, it is preferable to form the taper part 211 on the first cylinder's tip end side of the straight part 212 because it can prevent the situation that the lock balls 213 do not enter the straight part 212 but escape to the regions of the plastic part 210 or the taper part 211 and the lock balls 213 do not add the deceleration loadings to the column part 204a when the rod 204 is pressed back into the first cylinder 201.

In the above explanation, the lock balls 213 and the rubber ring 214 are provided in the first cylinder 201, however, the deceleration mechanism 213 can be provided in the other cylinders in the multi-stage cylinder, such as the second cylinder 202 and the third cylinder 203, etc. Further, in the above example, the first cylinder 201 to the third cylinder 203 has circular cross-sections, and the rubber ring 214 is a circular elastic body. However, for example, the first cylinder 201 to the third cylinder 203 may be tubes whose inlets may not be circular but polygon such as square, etc. and the rubber ring 214 may be a ring-shaped structure substantially similar to their inlets. Here, the "ring-shaped" is not limited to a circle but includes a closed shape such as polygon, etc.

In the above explanation, the mechanism has five lock balls 213 but it may have less or more than five the lock balls 213. Adjusting the number of the lock balls 213 enables adjusting the loading value to the rod 204 pushed back into the first cylinder 201. In the above example, the component for adding the deceleration load to the rod 204 (the locking member) is the lock balls 213, i.e., spherical component, but they do not have to be spherical. However, they are preferably spherical in consideration that they are disposed between the substantially column-shaped rod 204 and the cylindrical body of the first cylinder 201.

In the above explanation, it is described that the lock balls 213 dig into the inside of the cylinder, because the multistage cylinder is used. However, in case that the lock balls 213 dig into the outside, i.e., the first cylinder 201, a component which pushes the lock balls 213 against the inlet of the deceleration space, such as the rubber ring 214, allows the lock balls 213 to show properly the deceleration characteristic.

Second Embodiment

In the first embodiment, the rubber ring is inserted into the inside of the first cylinder, the lock balls are pressed against the taper part, and the plastic part is swaged to assemble the respective components in the state that the elasticity remains in the rubber ring. In this case, the pushing level of the rubber ring against the lock balls changes according to the way of swaging the plastic part. As a result, if the plastic part is swaged too hard, the elasticity does not remain in the rubber ring. Then, the lock balls cannot push down the rubber ring when the rod protrudes from the first cylinder so that they could interfere with the rod protrusion. The present embodiment described hereinafter can keep the pushing force of the lock balls substantially constant regardless of the way of swaging the plastic part. Here, the elements with the same reference numerals as in the first embodiment represent the identical or relative parts with the first embodiment and the explanations will be omitted.

Figure 13:
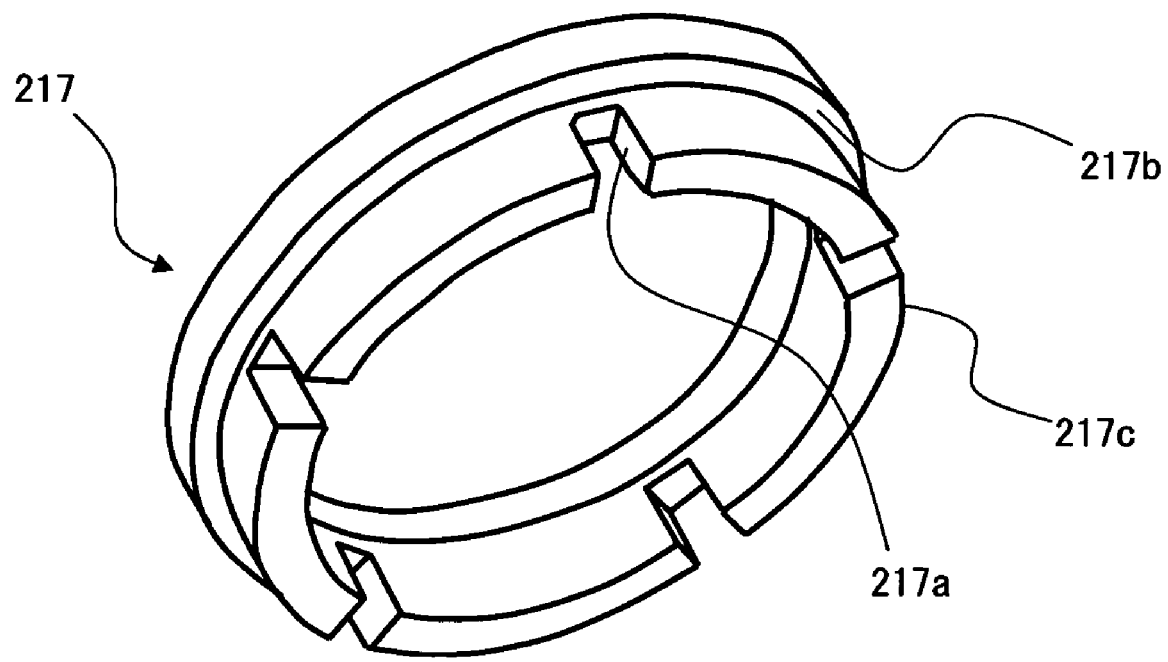
FIG. 13 is a perspective view schematically showing the rubber ring according to another embodiment of the present invention.

In the present embodiment, a pressing ring 217 is used instead of the rubber ring in the prior embodiment. Referring to FIG. 13, the pressing ring 217 according to the present embodiment is explained. The pressing ring 217 according to the present embodiment has an elastic ring 217c, which in an exemplary embodiment corresponds to the part pressing the lock component detailed above, having elasticity like the rubber ring of the prior embodiment and a plurality of notches 217a at one side thereof and has a positioning ring 217b having substantially the same inner diameter as the elastic ring 217c. The outer diameter of the elastic ring 217c is almost the same as the inner diameter of the straight part 212 and the structure is substantially the same as the first embodiment. The positioning ring 217b, which in an exemplary embodiment corresponds to the rigid part detailed above, is made of a material having rigidity such as a metal material and has a larger outer diameter than the elastic ring 217c. The positioning ring 217b is used for positioning the pressing ring 217 inside the first cylinder 201.

The positioning ring 217b and the elastic ring 217c are assembled with their central axes aligned with each other. The positioning ring 217b is at the opposite side to the notches 217a formed on the elastic ring 217c. Therefore, the pushing ring 217 has a step difference on the whole outer periphery thereof and has a shape that the outer diameter of the one end of the opening is large and the opposite side of the outer diameter is small. Specifically, the outer diameter of the side where the notches 217a are formed is smaller. The outer diameter of the positioning ring 217b is larger than the inner diameter of the straight part 212, and moreover, it is larger than the inner diameter of the tip end of the taper part 211, i.e., larger than the largest inner diameter of the taper part 211.

Figure 14A:
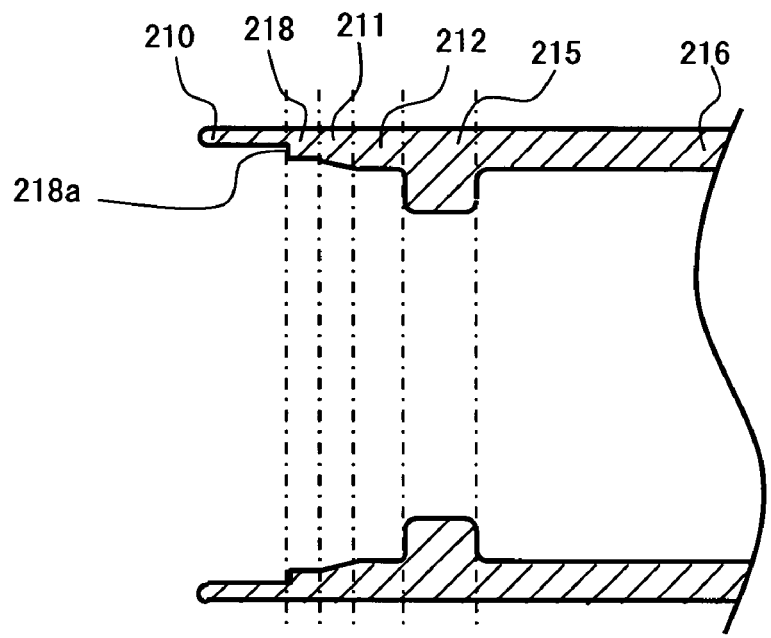
FIGS. 14A and 14B are cross-sectional views schematically showing a part of the actuator according to another embodiment of the present invention.

Now referring to FIG. 14A, the first cylinder 201 according to the present embodiment is explained. The first cylinder 201 according to the present embodiment has a ring receiving part 218 between the plastic part 210 and the taper part 211. The ring receiving part 218 is formed for positioning the pushing ring 217 inside the first cylinder 201. The ring receiving part 218 is a part whose inner diameter is substantially uniform in the first cylinder 201. The ring receiving part 218 is formed at the side where the inner diameter of the taper part 211 is larger and its inner wall is joined to the taper part 211 without a step difference.

That is, the largest diameter of the inner diameter of the taper part 211 and the inner diameter of the ring receiving part 218 is substantially the same. The inner diameter of the plastic part 210 is larger than the inner diameter of the ring receiving part 218 and the plastic part 210 and the ring receiving part 218 are continuous and there is a step difference 218a between them. The inner diameter of the ring receiving part 218 is smaller than the outer diameter of the positioning ring 217b of the pushing ring 217. The outer diameter of the positioning ring 217b is substantially the same as the inner diameter of the plastic part 210.

Figure 14B:
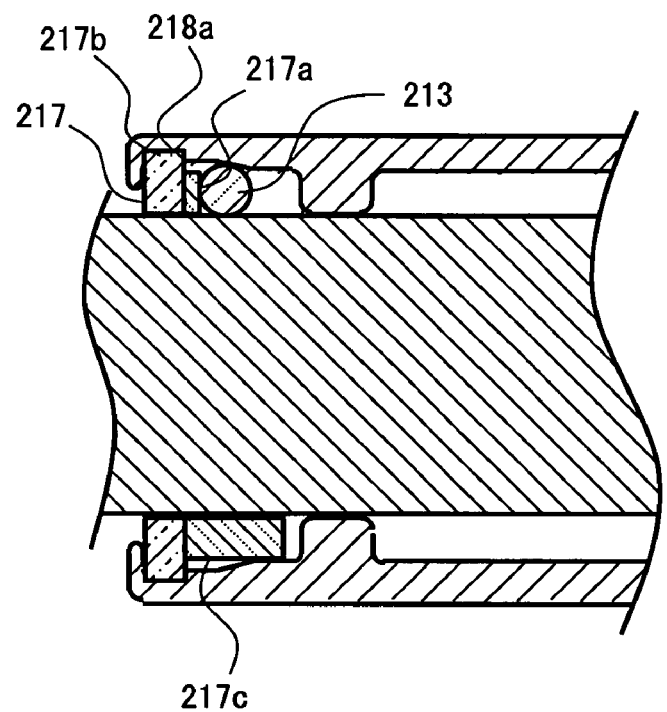

Next, referring to FIG. 14B, the assembling of the first cylinder 201, the rod 204, the lock balls 213, and the pushing ring 217 is explained. As shown in FIG. 14B, when the pushing ring 217 is inserted into the inside of the first cylinder 201, the positioning ring 217b is engaged with the step difference 218a. Hereby, the pushing ring 217 does not enter the back side of the first cylinder 210 any more and the position thereof is fixed. Swaging the plastic part 210 in this state results in fixing the lock balls 213 and the pushing ring 217.

In the state shown in FIG. 14B, the pushing ring 217 are located in such a manner that the lock balls 213 are pushed against the taper part 211, i.e., the inlet of the deceleration space. The elasticity remains in the elastic ring 217c, that is, the elastic ring 217c can be pressed and deformed by the lock balls 213 if the lock balls 213 move toward the tip end inside the first cylinder 201.

Even if the plastic part 210 is inserted too much into the inside of the first cylinder 201, only the positioning ring 217b is pressed between the step difference 218a and the plastic part 210, and the pushing ring 217 itself is not pushed into the back side of the firs cylinder 201. Accordingly, it can be prevented that the lock balls 213 are pushed against the taper part 211 more than necessary. As a result, it can be prevented that the elasticity does not remain in the elastic ring 217c so that the lock balls 213 interfere with the protrusion of the rod 204 from the first cylinder 201.

Namely, the pushing ring 217 which is pushed and fixed by the plastic part 210 eases fixing of the pushing ring 217. In this case, the pushing ring 217 is pushed toward the direction in which the lock balls 213 are pushed. Therefore, if the pushing pressure by the plastic part 210 is too strong, the force to push the lock balls 213 against the inlet of the deceleration space gets too strong so that a malfunction will occur when the rod 204 protrudes from the first cylinder 201. The configuration of the present embodiment with the positioning ring 217b of the pushing ring 217 engaging with the step difference 218a in the direction of pushing the lock balls 213 can solve such a problem.

In the above example, the positioning ring 217b is formed at one side of the opening direction of the pushing ring 217, but it may be formed at a middle of the opening direction at the outer peripheral of the pushing ring 217. In addition, the positioning ring 217b does not have to be formed along with the whole outer periphery of the pushing ring 217 but island-shaped positioning parts may be formed on the outer periphery of the pushing ring 217. Further, a component corresponding to the positioning ring 217b may be formed as a unit by the same main material as the elastic ring 217c.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An actuator mechanism for lifting a hood of a car in response to a shock to the car, comprising:
   a cylinder;
   a protrusion part protruding from the cylinder; and
   a lock component arranged along an outer periphery of the protrusion part in the cylinder, wherein
   when the protrusion part is pushed back into the cylinder, the lock component digs into the protrusion part to generate a deceleration loading at rest with respect to the cylinder in a space in which a gap between an inner surface of the cylinder and an outer surface of the protrusion part is smaller than a size of the lock component, and
   the lock component is a lock ball, and a plurality of lock balls are arranged at regular intervals alone an outer periphery of the protrusion part.

2. The actuator mechanism of claim 1, further comprising an outer cylinder larger than the cylinder,
   wherein the actuator mechanism is a multistage mechanism in which the cylinder protrudes from the outer cylinder.

3. The actuator mechanism of claim 1, wherein diameters of the lock balls are from 2 mm to 3.5 mm, and lapping amounts of the lock balls digging into the protrusion part are 0.1 mm to 0.3 mm.

4. The actuator mechanism of claim 1, further comprising a dividing part restricting a movement of the lock component in a direction along the outer periphery of the protrusion part in a plane perpendicular to a protrusion direction of the protrusion part.

5. The actuator mechanism of claim 1, further comprising a taper part which is a part of the cylinder, formed at an inlet of the space and has an inner diameter decreasing gradually in a direction from a protrusion side of the protrusion part to an opposite side,
   wherein the lock component moves in the space along an inner surface of the taper part and digs into the protrusion part.

6. The actuator mechanism of claim 1, further comprising a pressing part pressing the lock component toward an inlet of the space.

7. The actuator mechanism of claim 6, wherein the pressing part is elastic, and the lock component presses and deforms the pressing part to move away from the inlet of the space while the protrusion part is protruding from the cylinder.

8. The actuator mechanism of claim 6, wherein the pressing part comprises a dividing part restricting a movement of the lock component in a direction along the outer periphery of the protrusion part in a plane perpendicular to a protrusion direction of the protrusion part.

9. The actuator mechanism of claim 6, wherein the pressing part is a ring-shaped component arranged along the inner surface of the cylinder.

10. The actuator mechanism of claim 6, wherein the pressing part is fixed on the cylinder and is pressed in a direction that the pressing part presses the lock component, and a part of the pressing part engages with a part of the cylinder in the direction of the pressing of the lock component.

11. The actuator mechanism of claim 10, wherein the pressing part comprises a rigid part which is more rigid than a part pressing the lock component, and the rigid part engages with a part of the cylinder.

12. The actuator mechanism of claim 1, wherein the cylinder comprises a straight part of which an inner diameter is constant in the space in a direction from a protrusion side of the protrusion part to an opposite side, and
   the lock component digs into the protrusion part in a state of standing still on the straight part.

13. The actuator mechanism of claim 1, further comprising a stopper part stopping the lock component with respect to the cylinder in the space while the protrusion part is being pushed back into the cylinder.

* * * * *